United States Patent

Seki et al.

[11] Patent Number: 5,805,643
[45] Date of Patent: Sep. 8, 1998

[54] DIVERSITY RECEIVER SYSTEM USED IN DIGITAL COMMUNICATION

[75] Inventors: Keiko Seki, Sumida-ku; Koji Ogura, Kawasaki, both of Japan

[73] Assignee: Kabushiki Kaisha Toshiba, Tokyo, Japan

[21] Appl. No.: 814,152

[22] Filed: Mar. 10, 1997

Related U.S. Application Data

[63] Continuation of Ser. No. 201,176, Feb. 24, 1994, abandoned.

[30] Foreign Application Priority Data

Feb. 26, 1993 [JP] Japan ................................. 5-038023

[51] Int. Cl.$^6$ .......................... H04B 17/02; H04B 7/10
[52] U.S. Cl. ...................... 375/34.7; 375/327; 375/376; 455/133; 455/134
[58] Field of Search .................................. 375/267, 316, 375/324, 327, 328, 347, 373, 376; 455/132, 133, 134, 140, 151.2; 370/250, 251

[56] References Cited

U.S. PATENT DOCUMENTS

| | | | |
|---|---|---|---|
| 3,815,028 | 6/1974 | Rabow | 325/304 |
| 4,035,728 | 7/1977 | Ishikawa et al. | 455/132 |
| 4,843,633 | 6/1989 | Menich et al. | 455/33 |
| 4,864,641 | 9/1989 | Nakamura | 375/100 |
| 4,956,864 | 9/1990 | Brockman | 455/136 |
| 5,022,024 | 6/1991 | Paneth et al. | 370/341 |
| 5,203,023 | 4/1993 | Saito et al. | 455/134 |
| 5,278,867 | 1/1994 | Sehier et al. | 375/100 |
| 5,329,555 | 7/1994 | Marko et al. | 375/347 |
| 5,335,251 | 8/1994 | Onishi et al. | 455/132 |
| 5,430,769 | 7/1995 | Datsiokas et al. | 375/347 |
| 5,463,351 | 10/1995 | Marko et al. | 331/1 A |
| 5,499,397 | 3/1996 | Wadin et al. | 455/277.1 |

FOREIGN PATENT DOCUMENTS

| | | |
|---|---|---|
| 63-043438 | 2/1988 | Japan . |
| 3162020 | 7/1991 | Japan . |
| 4111621 | 4/1992 | Japan . |
| 5030084 | 2/1993 | Japan . |

OTHER PUBLICATIONS

Katsunori Miyatake, et al., "Selection Combining Diversity Reception Effect for Coherent QPSK Under Frequency Selective Fading", The Transactions of the IEICE, vol. E 73, No. 1 Jan. 1990.

Rajendra Kumar, "Novel Multireceiver Communication System Configurations Based on Optimal Estimation Theory" IEEE Transactions on Communications 40(1992) Nov., No. 11, New York.

*Primary Examiner*—Edward L. Coles
*Assistant Examiner*—Madeleine Au Nguyen
*Attorney, Agent, or Firm*—Loeb & Loeb LLP

[57] ABSTRACT

A diversity receiver system includes reception circuits connected to antennas for converting frequency of a received signal to a base band signal; a diversity branch comparison circuit for directing a base band signal to be used by comparing an intermediate frequency supplied through the reception circuit; a base band delay detection circuit for outputting a detection signal which is generated by a delay detection of the base band signal directed by the diversity branch comparison circuit; and a DPLL circuit for generating an internal clock by using the detection signal supplied from the base band delay detection circuit, thereby securing a stable reception and providing a diversity receiver system having a small circuit scale.

10 Claims, 4 Drawing Sheets

DIVERSITY RECEIVER SYSTEM USED IN DIGITAL COMMUNICATION

This is a continuation of application Ser. No. 08/201,176, filed on Feb. 24, 1994, now abandoned.

BACKGROUND OF THE INVENTION

The present invention relates to a diversity receiver system used in a digital communication, and more particularly, to a diversity receiver system capable of having a stable reception performance in spite of a condition of receiving a signal and capable of decreasing power consumption.

There are conventionally well known diversity receiver systems each having a plurality of reception antennas and which are used in a land mobile radiotelephone system, a mobile communication system, a portable telephone set system and a satellite communication system or the like. In such a receiver system, each of the reception antennas receives a signal relative to the same data so as to output only demodulation data selected from a plurality of the same data which are received by respective antennas. There will be described later a conventional diversity receiver system, for example, a diversity receiver for a portable telephone set system having two reception antennas.

FIG. 1 schematically shows a constitution of such a conventional diversity reception system.

In FIG. 1, reception antennas 10 and 20 each receive a radio signal transmitted from a base station.

The signal received by the reception antenna 10 is supplied to a reception circuit 11 in which a frequency of the signal is converted into a base band signal, thereby outputting an in-phase component $I_1$ and a quadrature (orthogonal) component $Q_1$ to a delayed detection circuit 12.

The delayed detection circuit 12 performs a delayed detection with respect to the in-phase component $I_1$ and the quadrature component $Q_1$ both supplied, respectively, so as to output reception clock component extraction signals $Id_1$ and $Qd_1$ which are generated by the wave detection.

A digital phase-locked loop (hereafter abbreviated to a DPLL) circuit 13 receives the reception clock component extraction signals $Id_1$ and $Qd_1$ to generate an internal clock. The internal clock is delivered to be used for judging a positive and negative of the reception clock component extraction signals $Id_1$ and $Qd_1$.

In the same manner, a signal which is received by the reception antenna 20 is also converted in its frequency into a base band signal in a reception circuit 21, and a delayed detection circuit 22 performs a delayed detection with respect to an in-phase component $I_2$ and an quadrature component $Q_2$ included in the base band signal to generate reception clock component extraction signal $Id_2$ and $Qd_2$ which are used for generating an internal clock in a DPLL circuit 23. The internal clock is delivered to judging circuits 24 and 25 to be used for judging a positive and negative of the reception clock component extraction signals $Id_2$ and $Qd_2$.

A diversity branch comparison circuit 30 compares an electric field strength of the reception signals which are respectively taken in the reception circuits 11 and 21 through the reception antennas 10 and 20 to determine the reception signal which is used as demodulation data so as to output a signal (a selective signal) representing a determined result.

A selector 31 selects any pair of signals $Id_1$, $Qd_1$ and $Id_2$, $Qd_2$ which are respectively outputted from the judging circuits 14, 15 and 24, 25 in correspondence with the selective signal supplied from the diversity branch comparison circuit 30.

A parallel/serial conversion circuit 32 converts the signals $Id^*$ and $Qd^*$ (namely, $Id_1^*$ and $Qd_1^*$ or $Id_2^*$ and $Qd_2^*$) supplied from the selector 31 into a serial signal to output demodulation data.

In this manner, the conventional diversity receiver has a plurality of demodulation systems comprising delayed detection circuits and the like corresponding to each of the reception antennas, for respectively demodulating the reception signal received by each reception antenna. According to this, a generation of the internal clock used in each demodulation system is respectively performed in any of the DPLL circuits 13 and 23 which are different from each other.

In the DPLL circuit of the diversity receiver, since the electric field strength of the reception signal of the reception antenna is very weak, it happens that the internal clock is not generated. In this case, if the electric field of the reception signal of the other reception antenna is strong, the diversity branch comparison circuit 30 selects the stronger reception signal.

In such a case, when the field strength of the reception signal of the demodulation system in which th internal clock has not been generated yet sharply increases to more than the field strength of the reception signal of the demodulation system in which the internal clock has already been generated, the diversity branch comparison circuit 30 changes the selection of the reception signal at once. However, even though it is possible to generate the internal clock by increasing the electric field strength of the reception signal, it is necessary to take a predetermined time period until a phase synchronization of the internal clock generated by the DPLL circuit is concentrated. Accordingly, before the phase synchronization by the DPLL circuit is concentrated, it happens that the reception signal of the demodulation system according to the DPLL circuit is issued as the demodulation data.

Therefore, in the conventional diversity receiver system shown in FIG. 1, it is impossible to secure a stable reception in the case where the electric field strength of the reception signal by the reception antenna sharply changes.

Furthermore, since it is necessary to provide the respective delayed detection circuit and DPLL circuit for each reception antenna, the circuit scale becomes large to not only obstruct a miniaturization and a low price of the portable telephone set, but also to become a cause of the increase of consumed power.

SUMMARY OF THE INVENTION

In view of the above-mentioned faults of the prior art, an object of the present invention is to provide a diversity receiver system capable of securing the stable reception and miniaturizing a circuit scale even though a receiving condition of the reception antenna sharply changes.

In order to achieve the above-mentioned object, a diversity receiver system according to the present invention, which has a plurality of antennas to output demodulation data of a reception signal selected from reception signals of these antennas, comprises a plurality of reception circuits each connected to any of the antennas for outputting a modulation signal by modulating the reception signal inputted through the antenna connected therewith, a comparison circuit for selecting any of the modulation signals to be used which are issued from the plurality of the reception circuits, a detection circuit for receiving the modulation signals from the plurality of reception circuits, and for outputting a detection signal of the modulation signal selected by the comparison circuit, and a digital phase-locked loop (DPLL)

circuit for generating an internal clock by using the detection signal which is inputted by the detection circuit.

The detection circuit according to the present invention outputs only the detection signal relating to the selected modulation signal by the comparison circuit from the detection signals which are obtained by detecting the modulation signals outputted from respective reception circuits. The digital phase-locked loop circuit generates the internal clock by using the detection signal supplied from the detection circuit. Therefore, immediately after the selection in the comparison circuit is changed, it is possible to use the internal clock itself by the modulation signal which is selected before the change.

Accordingly, since the present invention does not use the internal clock before the phase synchronization is concentrated, it is possible to secure the stable reception even though the electric field strength of the signal received by the reception antenna sharply changes.

Furthermore, since the it is possible to miniaturize the digital phase-locked loop circuit and the like, the circuit scale can be reduced.

As described above, since the diversity receiver system according to the present invention uses the internal clock before the change-over of the reception signal immediately after the reception signal to be used changes over, even when the receiving condition sharply changes, it is possible to secure stable reception.

Furthermore, since the digital phase-locked loop circuit and the like are commonly used, it is possible to miniaturize the circuit scale.

DETAILED DESCRIPTION OF THE PREFERRED EMBODIMENTS

There will be described in detail diversity receiver systems according to preferred embodiments of the present invention by way of an example of a portable telephone set in reference to the attached drawings.

Figure 2:
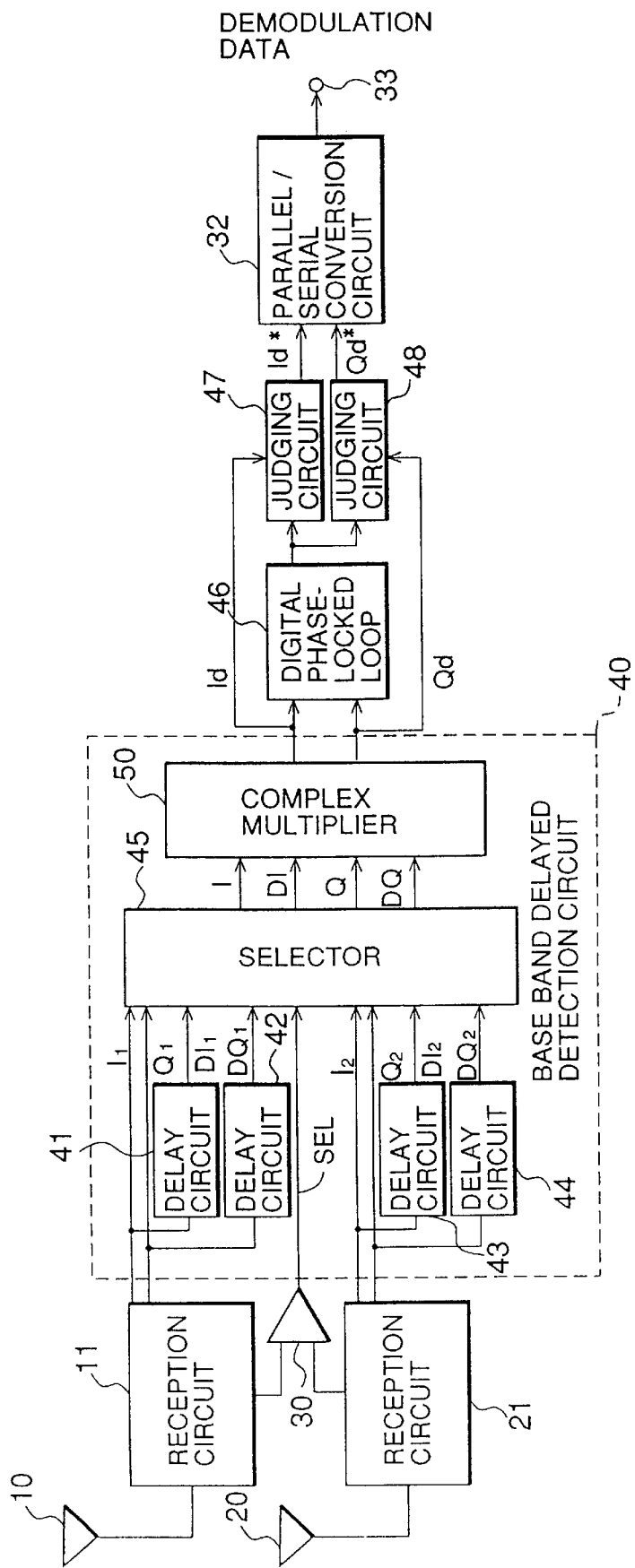
FIG. 2 is a block diagram schematically showing a constitution of a diversity receiver system according to a first embodiment of the present invention.
Figure 3:
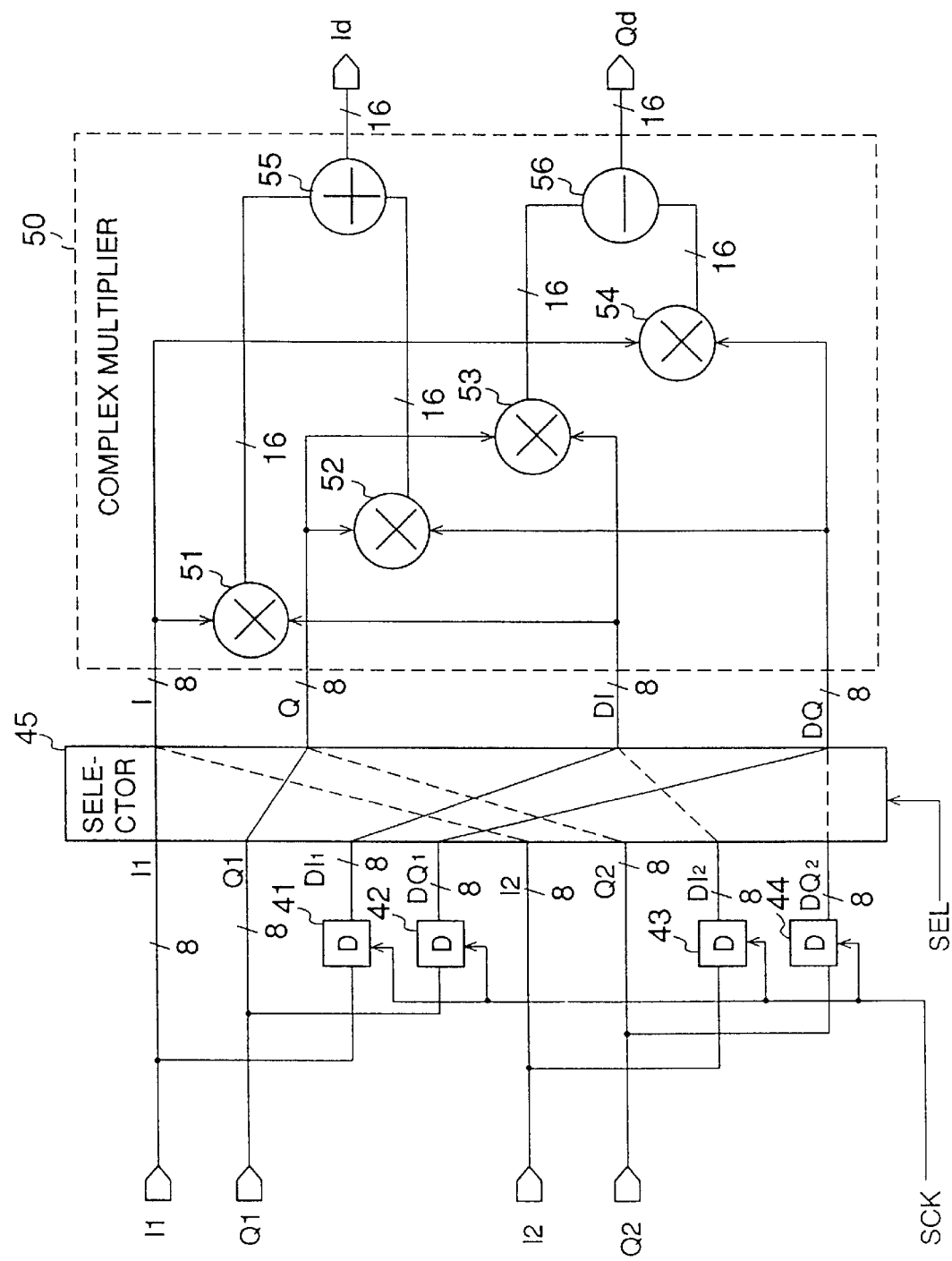
FIG. 3 is a block diagram schematically showing an internal constitution of a base band delayed detection circuit shown in FIG. 2.

FIG. 2 is the block diagram schematically showing the constitution of a diversity receiver system according to a first embodiment. Furthermore, FIG. 3 is the block diagram schematically showing the internal constitution of a base band delayed detection circuit 40 shown in FIG. 2.

Figure 1:
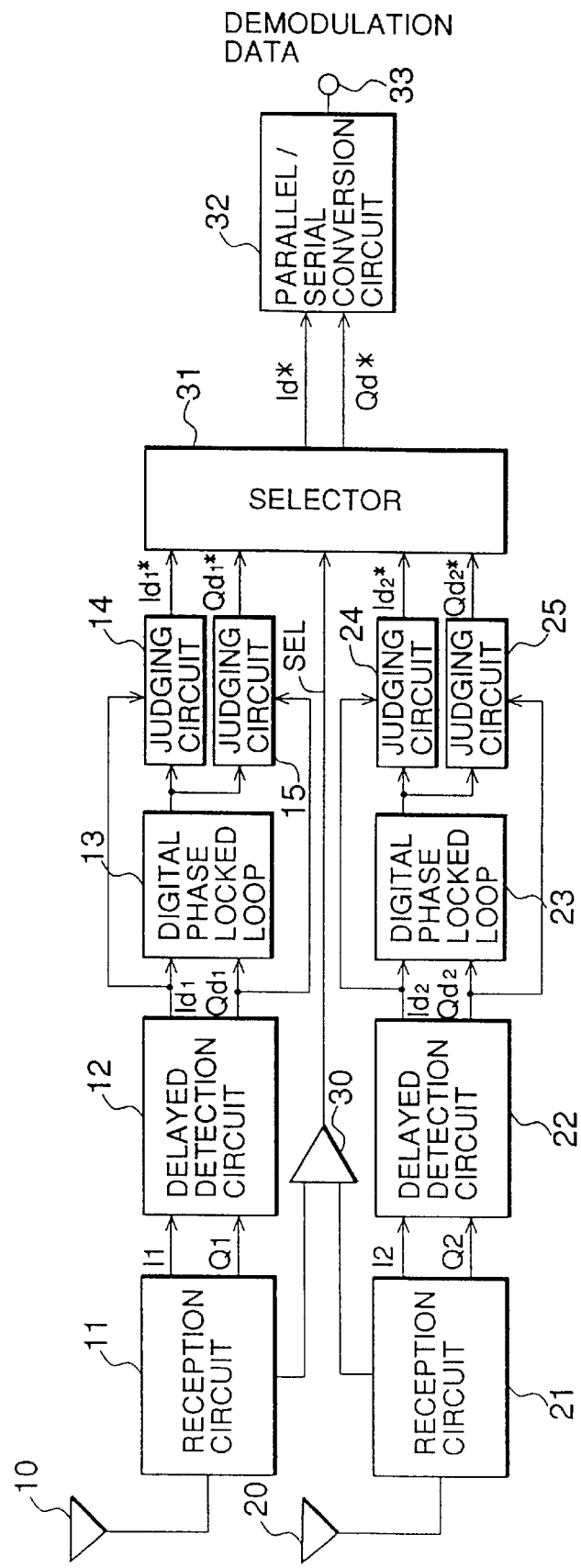
FIG. 1 is a block diagram schematically showing a constitution of the conventional diversity receiver system.

In FIG. 2, reception antennas 10 and 20 each receive a radio signal transmitted form a base station in the same manner as the conventional reception antennas (refer to FIG. 1).

Reception circuits 11 and 21 change frequencies of the reception signals which are received by the reception antennas 10 and 20, respectively, into base band signals. The reception circuit 11 outputs an in-phase component $I_1$ and a quadrature component $Q_1$ of one base band signal, while the reception circuit 21 outputs an in-phase component $I_2$ and a quadrature component $Q_2$ of another base band signal. In the first embodiment, it is supposed that each of the component signals $I_1$, $Q_1$, $I_2$ and $Q_2$ is an 8-bit signal.

Furthermore, these reception circuits 11 and 21 respectively output an intermediate frequency (IF) signal to a diversity branch comparison circuit 30.

The diversity branch comparison circuit 30 (corresponding to a "comparison circuit" of the present invention) compares the electric field strength of both reception signals by using the intermediate frequency signals which are supplied from the reception circuits 11 and 21, respectively, to determine the base band signal which will be converted into the demodulation data, thereby outputting a selective signal as a signal showing the determined result. The comparison may be performed by using the base band signal in the place of the intermediate frequency signal.

A base band delayed detection circuit 40 (corresponding to a "detection circuit" of the present invention) receives all of the components $I_1$, $Q_1$, and $I_2$, $Q_2$ of each of the above base band signals and the selective signal SEL. The detection circuit 40 only performs the delayed detection of the base band signal component selected by the selective signal SEL, and does not perform the delayed detection of the base band signal component which is not selected by the selective signal SEL.

In the base band delayed detection circuit 40, delay circuits 41, 42, 43 and 44 (corresponding to "delay means" of the present invention) input each of the base band signal components $I_1$, $Q_1$, $I_2$ and $Q_2$ according to a timing of a sample clock signal $S_{CK}$ so as to generate delay signals $DI_1$, $DQ_1$, $DI_2$ and $DQ_2$ which are delayed from each of signals by one symbol time.

A selector 45 (corresponding to "selection means" of the present invention) inputs all of the base band signal components $I_1$, $Q_1$, $I_2$ and $Q_2$, the delay signals $DI_1$, $DQ_1$, $DI_2$ and $DQ_2$ of respective components and the selective signal SEL. The selector 45 selects and outputs the base band signal components and respective delay signals which are selected by the selective signal SEL.

For example, when the selective signal of the comparison circuit 30 directs the base band signal outputted from the reception circuit 11, the selector 45 selects the component $I_1$ from the base band signal in-phase components $I_1$ and $I_2$ and outputs the component $I_1$ as the in-phase component signal I, and selects the component $Q_1$ from the base band signal quadrature components $Q_1$ and $Q_2$ and outputs the component $Q_1$ as the quadrature component signal Q. Furthermore, the selector 45 selects the delay signal $DI_1$ from the delay signals $DI_1$ and $DI_2$ and outputs the signal $DI_1$ as the delay signal DI, and selects the delay signal $DQ_1$ from the delay signals $DQ_1$ and $DQ_2$ and outputs the signal $DQ_1$ as the delay signal DQ.

A complex multiplier circuit 50 (corresponding to "calculation means" of the present invention) receives the output signals I, Q, DI and DQ from the selector 45 to perform the delayed detecting calculation. In the complex multiplier circuit 50, a multiplier 51 multiplies the signal I by the signal Q, a multiplier 52 multiplies the signal DI by the signal DQ, a multiplier 53 multiplies the signal DI by the signal Q, and the multiplier 54 multiplies the signal I by the signal DQ, so as to output calculated results of 16-bit signals, respectively. An adder 55 adds the output values of the multipliers 51 and 52 so as to output a detection signal Id of the in-phase component. Furthermore, a subtracter 56 subtracts the output values of the multipliers 53 and 54 with each other so as to output a detection signal Qd of the quadrature component.

A digital phase-locked loop (DPLL) circuit 46 inputs the output signals Id and Qd of the base band delayed detection circuit 40 to generate an internal clock. the internal clock is delivered to judging circuits 47 and 48 and is used for judging the positive and negative of the signals Id and Qd.

The parallel/serial conversion circuit 32 converts parallel signals Id* and Qd* of the 16-bit signals as the judged result into serial signals to output the demodulation data.

In such a manner, the first embodiment has only one DPLL circuit which only generates the internal clock by using the signal selectively detected by the base band delayed detection circuit 40. Namely, the selection of the reception signals is performed before the internal clock is generated without the selection of the demodulation data which are outputted after each of the reception signals is demodulated in the manner of the conventional diversity receiver system shown in FIG. 1.

Accordingly, in the diversity receiver system with reference to the first embodiment of the present invention, immediately after the selection is switched over by the change of the electric field strength of the reception signal, the system uses the internal clock itself which is based on the reception signal before switching over. Therefore, since there is not a possibility that the internal clock before the concentration of the phase synchronization is used, it is possible to secure stable reception even in the case where there is a sharp change of the electric field strength of the reception signal through the reception antenna.

Furthermore, since all of the antennas can be commonly used for the same DPLL circuit 46 and complex multiplier circuit 50, it is possible to miniaturize the circuit scale.

When the positive and negative are judged by the internal clock generated by using an output of the delayed detection performed after the diversity selection, if the delaying difference at the reception time between the reception signals of one reception antenna and the other reception antenna is sharply large, there is a general possibility that jitters of the clock become large at switching over the diversity branch. Therefore, when the delaying difference is large as above, it is necessary to provide a waveform equalizing circuit for compensating a multipath, which is a circuit for decreasing the jitters. However, a delayed detection method used in the first embodiment is a method that is used when it is no problem that there is a delaying difference between the reception signals from respective reception antenna. Accordingly, since this method has a premise that such a problem does not occur, it is unnecessary to use the waveform equalizing circuit for compensating the multipath.

Even though the first embodiment of the present invention is described above, the present invention is not limited to the first embodiment.

For example, even though the selector 45 is provided before the complex multiplier circuit 50 for selecting the base band signal, the selection of the base band signal may be performed after a calculation of the delayed detection by the complex multiplier circuit 50. Namely, since a commonness of the DPLL circuit can achieve an effect of the present invention for stabilizing the reception signal, the selection of the reception signal may be performed at least before the DPLL circuit. However, since the common (or shared) circuits are desired to be more in order to miniaturize the circuit scale, it is suitable that the selector 45 is provided before the complex, multiplier circuit 50 for commonly using the complex multiplier circuit.

Furthermore, even though the first embodiment as an example is applied to the portable telephone set having two reception antennas, the present invention may be applied to the telephone system having more than two reception antennas, and to other apparatus and devices, thereby naturally obtaining the same effect.

Figure 4:
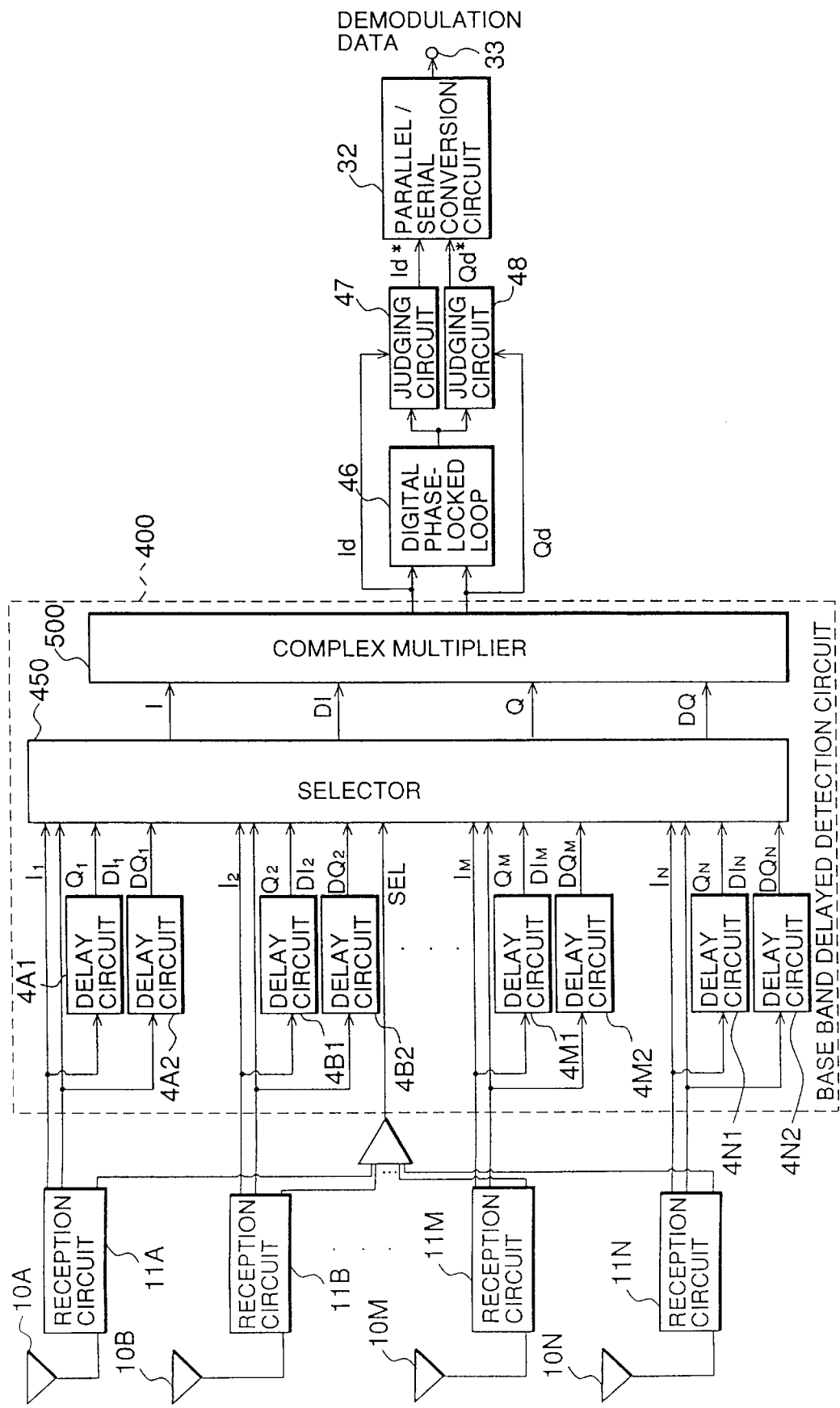
FIG. 4 is a block diagram schematically showing a constitution of a diversity receiver system according to a second embodiment of the present invention.

FIG. 4 shows a diversity reception system according to a second embodiment of the present invention for describing in more detail.

In FIG. 4, a plurality of antennas 10A, 10B, . . . , 10M and 10N are connected to a plurality of reception circuits 11A, 11B, . . . , 11M and 11N, respectively. The plurality of reception circuits 11A, 11B, . . . , 11M and 11N output intermediate frequency signals to a diversity branch comparison circuit 300 which compares an electric field strength of a plurality of the intermediate frequency signals inputted thereto so as to determine a base band signal which will be converted into demodulated data, thereby outputting a selecting signal SEL showing a determined result to a selector 450.

On the other hand, the reception circuits 11A, 11B, . . . , 11M and 11N respectively output in-phase components $I_1$, $I_2$, . . . , $I_M$ and $I_N$ and quadrature components $Q_1$, $Q_2$, . . . , $Q_M$ and $Q_N$ to the selector 450, and respectively supply the in-phase components $I_1$, $I_2$, . . . , $I_M$ and $I_N$ to delay circuits 4A1, 4B1, . . . , 4M1, 4N1 so as to obtain delayed signal $DI_1$, $DI_2$, . . . , $DI_M$ and $DI_N$ and quadrature components $Q_1$, $Q_2$, . . . , $Q_M$ and $Q_N$ to delay circuits 4A2, 4B2, . . . , 4M2 and 4N2 so as to obtain delayed signal $DQ_1$, $DQ_2$, . . . , $DQ_M$ and $DQ_N$.

The selector 450 outputs each of the signal components I, DI, Q and DQ of anyone selected from the reception circuits 11A, 11B, . . . , 11M and 11N, which is determined by the selecting signal SEL, to a complex multiplier 500 as calculation means. The complex multiplier 500 has a configuration the same as the complex multiplier 50 of the first embodiment shown in FIG. 3, and outputs the detection signal Id of the in-phase component and the detection signal Qd of the quadrature component by the calculation in a plurality of stages.

The detection signals Id and Qd of the respective components outputted from the complex multiplier 500, are supplied to a digital phase-locked loop circuit 46 and judging circuits 47 and 48, respectively, thereby outputting parallel signals Id* and Qd* of 16 bits to the parallel/serial conversion circuit 32 which supplies a demodulation data to the output terminal 33 of the diversity receiver system.

As described above, in the diversity receiver system according to the second embodiment having a large number of antennas (more than three), it is possible to provide one DPLL circuit 46 and a pair of the judging circuits 47 and 48 for the in-phase and quadrature components, respectively, in the manner of the diversity receiver system according to the first embodiment having two antennas.

Analogizing from the system of the first embodiment corresponding to the conventional system in the case of two antennas, as clearly understood by the system of the second embodiment having a large number of the antennas as shown in FIG. 4, the conventional system having a large number of antennas needs a large number of DPLL circuits corresponding to the number of antennas. Accordingly, by the system of the second embodiment, the specific effect is expected in that a common utilization of the DPLL circuit and the like causes the circuit scale to be miniaturized even further than the system according to the first embodiment.

What is claimed is:

1. A diversity receiver system for digital communication having a plurality of antennas for outputting demodulation data of a received signal selected from reception signals of the plurality of antennas, the diversity receiver system comprising:
   a plurality of reception circuits each of which is connected to corresponding one of said plurality of antennas and each of which outputs a modulation signal generated from the received signal supplied through said antenna;
   comparison means for directing one of said modulation signals, which are each outputted from one of the reception circuits, to be used as selected modulation signal;
   a selector receiving said plurality of modulation signal output by each of said reception circuits, a selector outputting one of the modulated signal as said selected modulation signal in accordance with the direction of said comparison means; and
   a digital phase locked loop coupled to the selector, the digital phase locked loop using said detection signal supplied from said a selector to generate an internal clock,
   wherein the internal clock generated by the digital phase locked loop is used in demodulating the detection signal.

2. The diversity receiver system according to claim 1, wherein said plurality of antennas and said plurality of reception circuits for supplying said reception signal to said comparison means and said detection means comprise a first antenna and a first reception circuits, and a second antenna and a second reception circuit.

3. The diversity receiver system according to claim 1, wherein said plurality of antennas and said plurality of reception circuits for supplying said reception signal to said comparison means and said detection means comprise first through N-th (N is more than three) antennas and first through N-th reception circuits corresponding to said first through N-th antennas.

4. The diversity receiver system according to claim 1, further comprising judging circuitry that receivers the detection signal and demodulates the detection signal using the internal clock generated by the digital phase locked loop.

5. A diversity receiver system for digital communication having a plurality of antennas for outputting demodulation data of a received signal selected from reception signals of the plurality of antennas, the diversity receiver system comprising:
   a plurality of reception circuits each of which is connected to a corresponding one of said plurality of antennas and each of which outputs a modulation signal generated from the received signal supplied through said antenna;
   comparison means for directing a selected modulation signal to be used from said modulation signals which are respectively outputted from said plurality of reception circuits;
   detection means for receiving said plurality of modulation signals, which each include an in-phase component signal and a quadrature component signal, from said plurality of reception circuits and for outputting as a detection signal said selected modulation signal selected by said comparison means; and
   a digital phase locked loop generating an internal clock by using said detection signal supplied from said detection means,
   wherein said detection means comprises a base band delay detection circuit including:
   delay means for delaying the in-phase component signal and the quadrature component signal of said modulation signals respectively supplied from each of said plurality of reception circuits to generate and output a delayed modulation signal that includes a delayed in-phase component signal and a delayed quadrature component signal;
   selection means for receiving said modulation signals and said delayed modulation signals and outputting any one of said modulation signals and any one of said delayed modulation signals as directed by said comparison means; and
   calculation means for performing a complex number calculation between the in-phase component signal and the delayed in-phase component signal and between the quadrature component signal and the delayed quadrature component signal to perform a delayed detection calculation so as to output the most sensitive modulation signal to the digital phase locked loop as the detection signal.

6. The diversity receiver system according to claim 5, wherein said calculation means comprises a complex multiplier including:
   a first multiplier for multiplying an in-phase component with a quadrature component of said selected modulation signal;
   a second multiplier for multiplying a delayed in-phase component with a delayed quadrature component of a selected delayed modulation signal;
   a third multiplier for multiplying said in-phase component of said modulation signal with said delayed quadrature component of said selected delayed modulation signal;
   a fourth multiplier for multiplying said in-phase component as said modulation signal with said delayed quadrature component of said selected delayed modulation signal;
   an adder for adding an output of said first multiplier with an output of said second multiplier to output an in-phase component detection signal; and
   a subtracter for performing a subtraction between an output of said third multiplier and an output of said fourth multiplier to output a quadrature component detection signal.

7. A diversity receiver system for digital communication for outputting demodulation data of a received signal selected from reception signals, each of the reception signals being supplied from one of a plurality of antennas that are provided for the diversity receiver system, said diversity receiver system comprising:
   a plurality of reception circuits, each reception circuit being connected to a corresponding one of the antennas and outputting a modulated signal that is generated from the received signal supplied through the antenna;
   a comparison circuit coupled to the reception circuits, the comparison circuit determining which one of the modulated signals output from the reception circuits to use as a selected modulated signal;
   a selector receiving the modulated signal output by each of the reception circuits and outputting one of the modulated signals as the selected modulated signal in accordance with the determination of the comparison circuit; and
   a digital phase locked loop coupled to the selector, the digital phase locked loop receiving the selected modulated signal from the selector and generating an internal clock using the selected modulated signal from the selector.

8. The diversity receiver system according to claim 7, further comprising a base band delay detection circuit that includes:

delay circuitry for delaying the modulated signals output from each of the reception circuits to output a delayed modulated signal for each of the modulated signals;

the selector, the selector also receiving the delayed modulated signals and also outputting one of the delayed modulated signals as the selected delayed modulated signal in accordance with the determination made by the comparison circuit; and a calculation circuit that performs a delayed detection calculation using the selected modulation signal and the selected delayed modulation signal output from the selector.

9. The diversity receiver system according to claim 8, wherein the calculation circuit comprises a complex multiplier that includes:

a first multiplier for multiplying an in-phase component with a quadrature component of the selected modulation signal;

a second multiplier for multiplying a delayed in-phase component with a delayed quadrature component of the selected delayed modulation signal;

a third multiplier for multiplying the in-phase component of the selected modulation signal with the delayed quadrature component of the selected delayed modulation signal;

a fourth multiplier for multiplying the in-phase component as the selected modulation signal with the delayed quadrature component of the selected delayed modulation signal;

an adder for adding an output of the first multiplier with an output of the second multiplier to output an in-phase component detection signal; and a subtracter for performing a subtraction between an output of the third multiplier and an output of the fourth multiplier to output a quadrature component detection signal, wherein the in-phase component detection signal and the quadrature component detection signal are supplied to the digital phase locked loop and are used by the digital phase locked loop to generate the internal clock.

10. The diversity receiver system according to claim 7, wherein the internal clock generated by the digital phase locked loop is used by judging circuitry to demodulated the selected modulated signal.

\* \* \* \* \*